April 3, 1934.  J. W. OSTEN  1,953,770
REMOVABLE TOP FOR RUMBLE SEATS FOR AUTOMOBILES
Filed Oct. 8, 1931  2 Sheets-Sheet 1
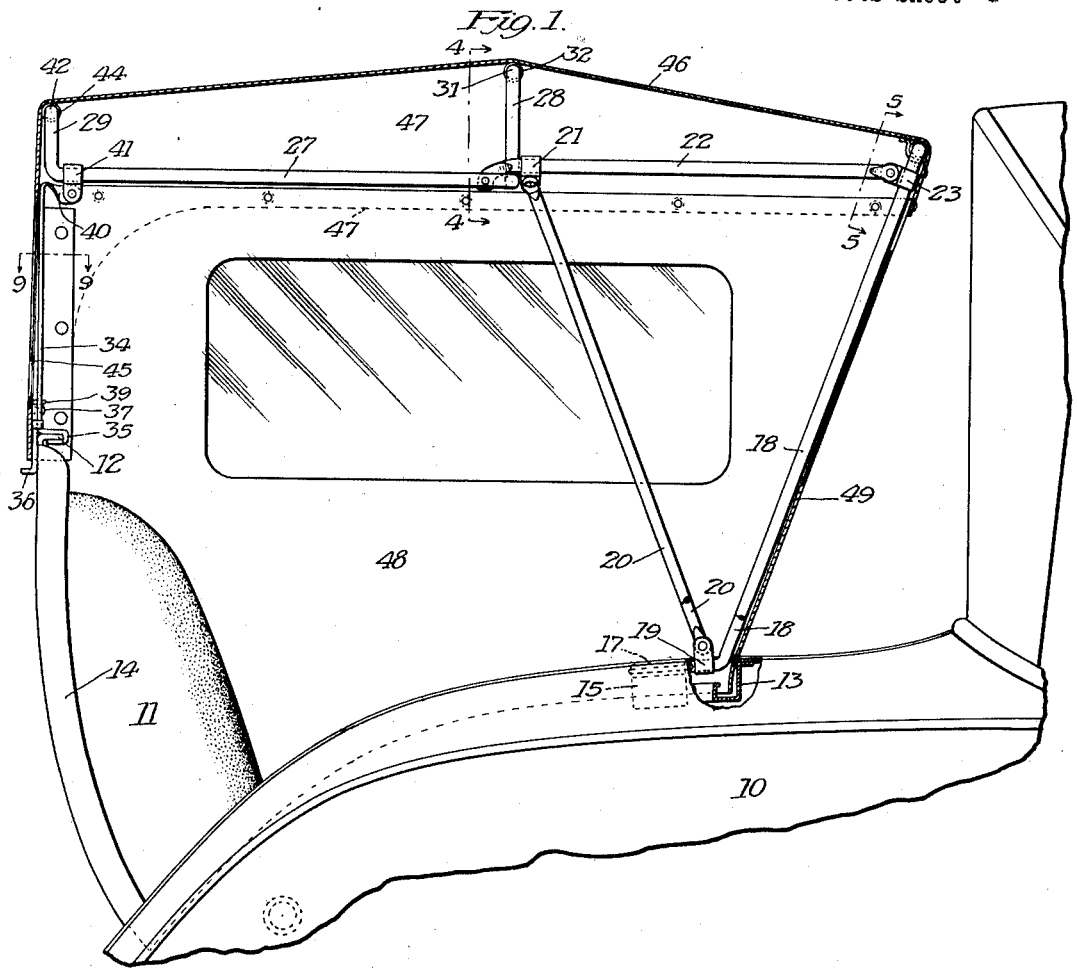
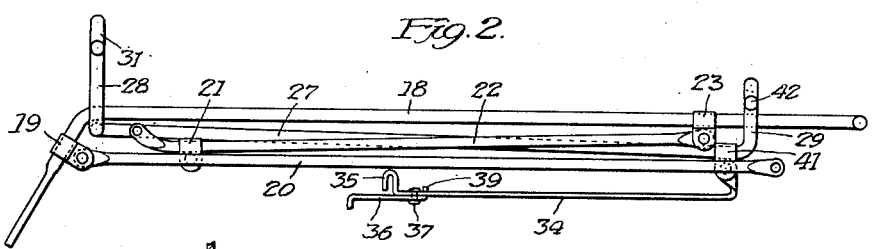
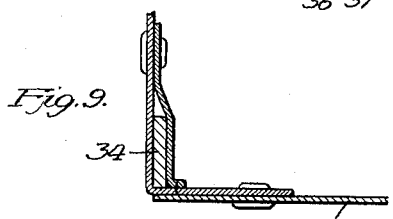
Inventor
Joseph W. Osten April 3, 1934. J. W. OSTEN 1,953,770
REMOVABLE TOP FOR RUMBLE SEATS FOR AUTOMOBILES
Filed Oct. 8, 1931 2 Sheets-Sheet 2
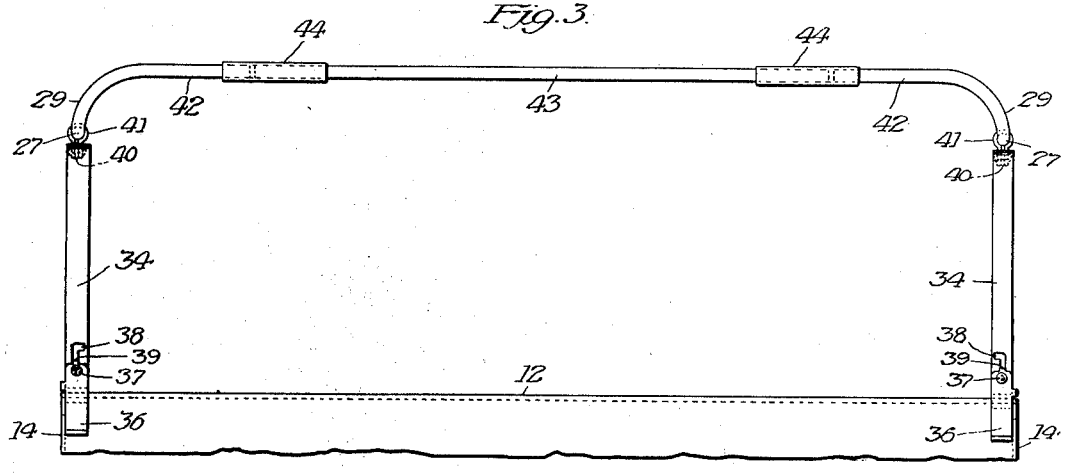
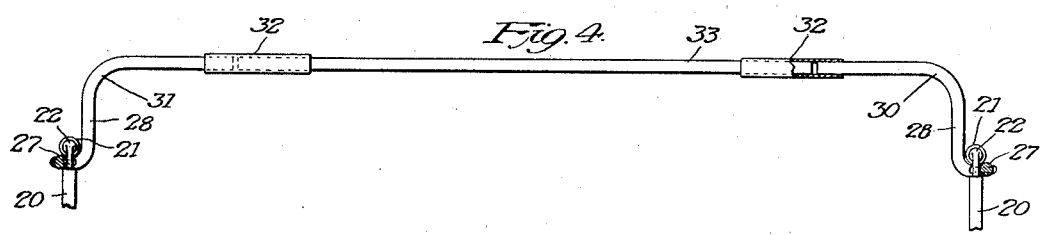
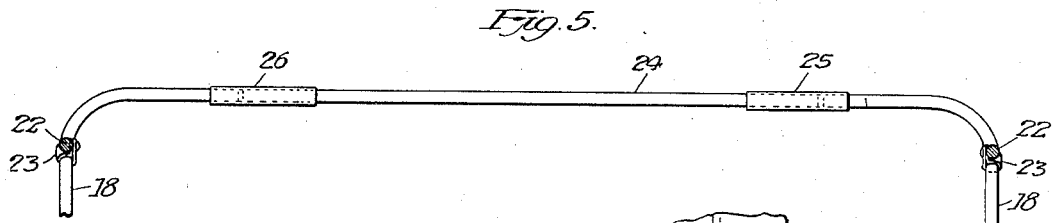
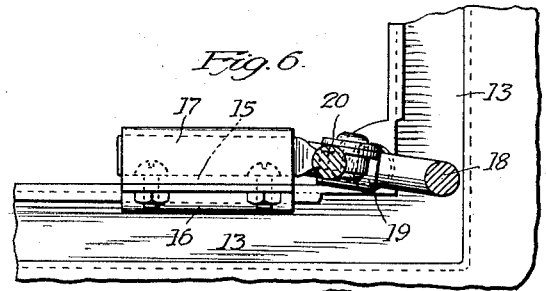
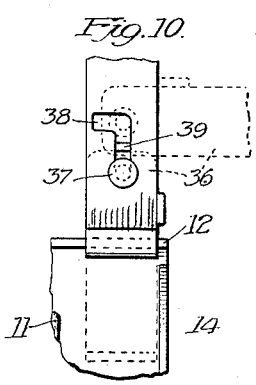
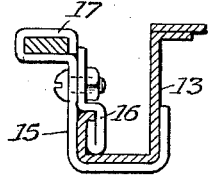
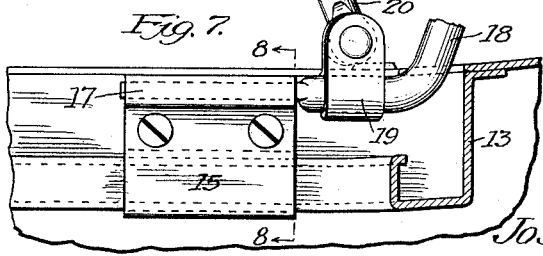
Inventor
Joseph W. Osten Patented Apr. 3, 1934

1,953,770

UNITED STATES PATENT OFFICE 1,953,770

REMOVABLE TOP FOR RUMBLE SEATS FOR AUTOMOBILES

Joseph W. Osten, Chicago, Ill.

Application October 8, 1931, Serial No. 567,529

3 Claims. (Cl. 296—99)

My invention relates to a removable top for rumble seats for automobiles, and has for its primary object the provision of a top which is easily placed in position to protect the occupants of a rumble seat when desired, and which can be easily and quickly removed and folded into a small space for carrying, when it is not desired to use the top.

Another and further object of my invention is the provision of a rumble seat top for automobiles which comprises two sets of side members which are easily and quickly attached to the automobile and which, when it is not desired to use the top, can be easily and quickly removed and folded into a small space and carried in the compartment occupied by the rumble seat or some other convenient place in the automobile.

Another and further object of my invention is the provision of an automobile top, the framework of which is easily adjustable for various widths of automobile bodies, and which is adapted to be fitted to any size or type of car having a rumble seat incorporated as a part thereof.

Another and further object of my invention is the provision of a rumble seat top cover which thoroughly protects the occupants of the rumble seat and which is mounted independently of the permanent top covering the fixed seat of the automobile, and is therefore movable independently of this top so that the strains and movements of the permanent top are not communicated to the rumble seat top and stays in position easier and better than if connected to the fixed top of the automobile.

Another and further object of my invention is the provision of a rumble seat top which can easily be detached from its rear support, and the rear portion folded forward so that easy access to and exit from the rumble seat can be had, and which is sufficiently large in size to completely protect the occupants of the rumble seat without inconvenience or unnecessary crowding.

These and other objects of my invention will be more fully and better understood by reference to the accompanying sheets of drawings, in which—

Figure 1 is a view partially in section and partially in elevation showing my improved top in position on an automobile;

Figure 2 is an elevational view of one set of the side members in folded position;

Figure 3 is a transverse sectional view of the rear portion of the top illustrated in Figure 1;

Figure 4 is a view on line 4—4 of Figure 1;

Figure 5 is a sectional view on line 5—5 of Figure 1;

Figure 6 is a fragmentary top view of the bracket and side of the car showing the means employed for securing the frame members at the side of the automobile body;

Figure 7 is a side elevational view of the device shown in Figure 6;

Figure 8 is a sectional view on line 8—8 of Figure 7;

Figure 9 is a cross sectional view on line 9—9 of Figure 1; and

Figure 10 is a detail view in elevation showing the fastening device at the rear of the rumble seat.

Referring now specifically to the drawings, and in which like reference characters refer to like parts throughout, an automobile body 10 is shown, having a rumble seat back 11, with the usual flange 12 extending across the back of the rumble seat, and a channel or gutter member 13 mounted in the automobile body 10 and extending transversely across the automobile body adjacent the forward edge of the opening for the rumble seat and also extending along the sides of the body of the automobile and into which the flange member 12 at the top and flange members 14 at the side of the back of the rumble seat 11 fit, when the rumble seat is in closed position. This channel or gutter provides means to catch the water which runs from the top or from the seat, and drain it rearward to prevent its flowing into the rumble seat opening.

Mounted at each side of the automobile body are U-shaped brackets 15, 15 which extend around the channel 13 and have cooperating members 16, 16 secured thereto by means of bolts. The cooperating members have outwardly turned ends which fit under the inwardly turned edges of the channel 13. The brackets 15 have socket portions 17, 17 into which the lower ends of a pair of legs 18, 18 are positioned, their ends being flattened, as shown in Figure 8, and adapted to fit into the socket portions of the brackets 15, 15, as shown. Adjacent the lower ends of these legs 18, 18 are clips 19, to which bracing legs 20, 20 are attached, these legs 20 extending upward and rearwardly where they are secured to brackets 21, 21 by means of removably positioned bolts, these brackets 21, 21 being mounted upon front horizontally extending side rods 22, 22. The rods 22 at the forward end are secured to brackets 23, 23 which are mounted upon the front legs 18 near their upper ends. The upper ends of the legs 18 are inwardly turned (Fig. 5) and are connected together by means of a transversely extending rod 24, having slidably mounted sleeves 25 and 26 thereon, these sleeves being adapted to frictionally engage the ends of the legs 18, 18 rather tightly, and are slidably mounted upon each end of the rod 24 so that they span the space between the legs 18, 18 on each side of the automobile body and provide a support for the top at its forward edge.

Extending rearwardly from the rods 22, 22 in a horizontal direction at each side of the top, is a pair of rear side rods 27, 27, these members being pivotally connected to the rear end of the front rods 22 and have upturned end portions 28 at their forward ends and 29 at their rear ends, which are inwardly turned at 30 and 31 and over which socket members 32, 32, mounted upon a transversely extending rod 33, are adapted to pass, this rod forming a support for the top and the connecting member for the frame at the central portion thereof. The rear ends of the front rods 22, 22 are curved downwardly and rest upon an inwardly turned portion of the rear rods 27, 27, these rods 22 and 27 being hinged together so they lock in horizontal position. When the top is in fixed position these rods are held in locked relation by the bracing legs 20, 20.

The rear portion of the top framework for the top comprises a pair of vertically extending members 34, 34, which have U-shaped portions 35, 35 at their lower ends adapted to fit over the flange portion 12 forming a part of the back portion of the rumble seat of the automobile. Locking members 36, 36 are secured to the members 34 by means of rivets 37, 37, which are fixed to the members 36, 36 and extend through L-shaped slots 38 in the members 36, 36. The locking members 36 have their upper ends reduced in size with inwardly turned lug portions 39 thereon which extend into the L-shaped slots 38 in the member 34. The locking members are therefore slidably mounted in the members 34, and can also be turned to one side when the members 34 are detached from the member 12. The upper ends of the members 34 have inwardly turned portions 40 to which clips 41, 41 are secured by means of rivets, and through which the rear side rods 27 extend, the ends of these rods having inwardly turned portions 42, 42 which are connected by means of a transversely extending rod 43 having sockets 44, 44 on each end thereof which pass over the ends 42 of the members 27 so that these members are held firmly and a support provided for the top at the rear side thereof.

The hood comprises a back curtain 45 which is secured to the members 34 by means of snap fasteners, a top 46 which is secured to the upper edge of the back member and extends across the top of the frame and a short distance down the front side thereof, with quarter portions 47 at the sides thereof which extend slightly below the side rods, and to which side curtains, such as 48, are secured in the usual manner. A front curtain 49 is provided which is secured to the forward marginal edge of the top 46 by means of snap fasteners, and extends down into the gutter 13. The lower edge of the side curtains are fitted into the gutter channel so as to provide means for drainage of water and the like away from the rumble seat, and are secured to the back curtain in the usual manner so the rumble seat is entirely enclosed if desired.

In operation, the device is attached to an automobile by fitting the lower ends of the legs 18 into the sockets 17, and then securing the bracing legs 20, 20 into position and bolting them to the brackets 21, 21. The rear side rods 27 and back members 34 are opened backwards and the looped portions of the members 34 placed over the flange 12, the fastening members 36 being lifted and turned to one side until the members 34 are in position and are then turned and slid downward, thus locking the members 34 in position. The cross members 24, 33, and 44 are then placed in position and the frame for the top is complete. The top is then placed over the frame by first placing the front portion in position and then drawing the top into position over the rear portion of the frame. The side and front curtains can then be placed in position if desired. In removing the top the reverse operation is performed by first removing the side curtains and then the top, removing the cross members, unfastening the frame at its rear end, lifting it upward and folding it forward and then slipping the legs 18 out of their sockets. The detaching of the bracing legs 20, 20 from the clips 21 allows the frame to fold into the position shown in Figure 2.

After the top is in position, and to allow for easy access to and exit from the rumble seat, the members 34 are detached from the flange at the rear edge of the seat, and the rear end of the top lifted up and folded forward. This allows ample room for occupants to leave the rumble seat, and also permits much more easy access to the seat than if entrance to or exit from the rumble seat be had from the sides and under the edges of the top.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A rumble seat top for an automobile, comprising in combination, a pair of legs detachably connected to the body of an automobile body adjacent the rumble seat opening at its forward edge, side braces extending rearwardly from each of said legs at their upper ends, bracing legs secured to the lower ends of said first mentioned legs and to said side braces, rear support members detachably secured to the upper edge of the rumble seat, side braces extending forwardly therefrom and hingedly connected to said first mentioned side braces and having upwardly and inwardly turned end portions, cross members detachably secured to said last mentioned braces, a cross member detachably connected to the first mentioned legs at their upper ends, and a covering for said frame.

2. A rumble seat top for an automobile, comprising in combination, a pair of legs detachably connected to the body of an automobile body adjacent the rumble seat opening at its forward edge and having inwardly turned ends, side braces extending rearwardly from each of said legs at their upper ends, bracing legs secured to the lower ends of said first mentioned legs and to said side braces, rear support members detachably secured to the upper edge of the rumble seat, side braces extending forwardly therefrom and hingedly connected to said first mentioned side braces and having upwardly and inwardly turned end portions, cross members detachably secured to said last mentioned braces, a cross member detachably connected to the first mentioned legs at their upper ends, and a covering for said frame.

3. A rumble seat top for an automobile, comprising in combination, a pair of legs detachably connected to the body of an automobile, side braces connected thereto at their upper ends and extending rearwardly therefrom, bracing legs hingedly secured to said first mentioned legs and to the rear ends of said braces, a cross member connecting the said legs at their upper ends, rear support members detachably secured to the upper edge of the rumble seat, side braces extending forwardly therefrom having upturned and inturned ends and hingedly connected with the said first mentioned side braces forming a unit hingedly secured to the forward portion of said top to allow ingress and egress from said automobile seat, cross members secured to the ends of said last mentioned side braces, and a flexible covering for the frame hereinabove mentioned.

JOSEPH W. OSTEN.